J. H. LEA.
INCINERATING PLANT.
APPLICATION FILED JUNE 11, 1915.
1,175,777.
Patented Mar. 14, 1916.
4 SHEETS—SHEET 4.
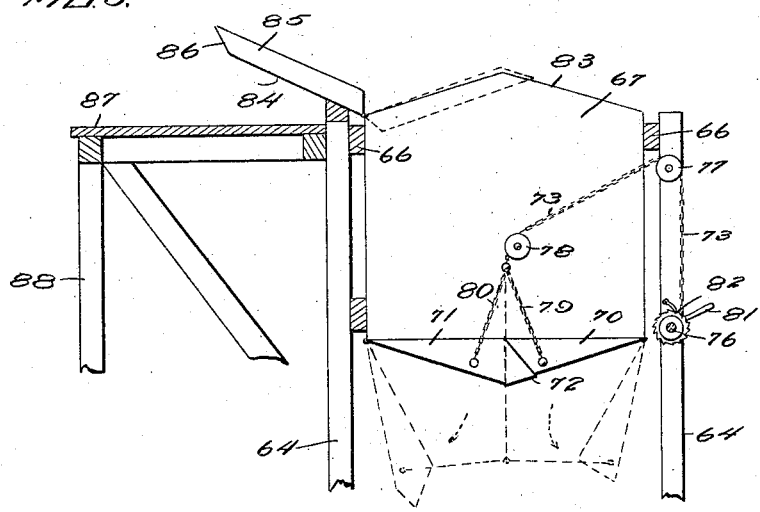
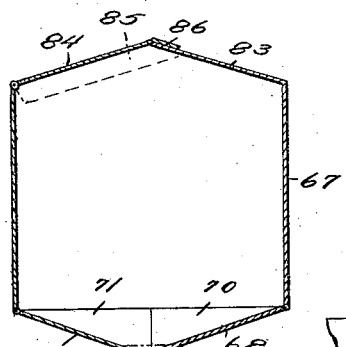
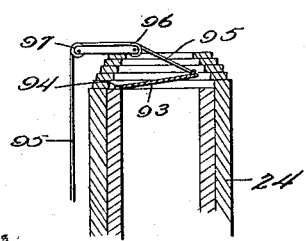
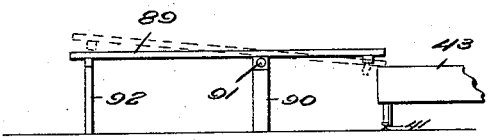
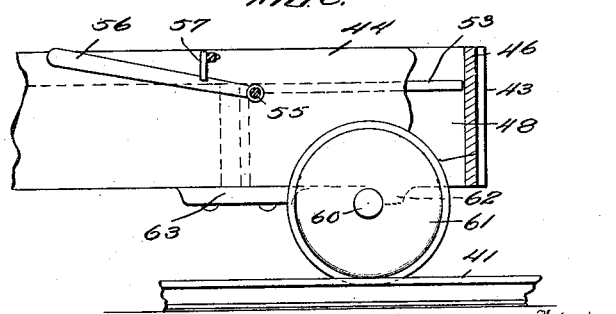
Witness
R. J. Trogner.
Inventor
John H. Lea.
By Mason Fenwick Lawrence,
Attorneys

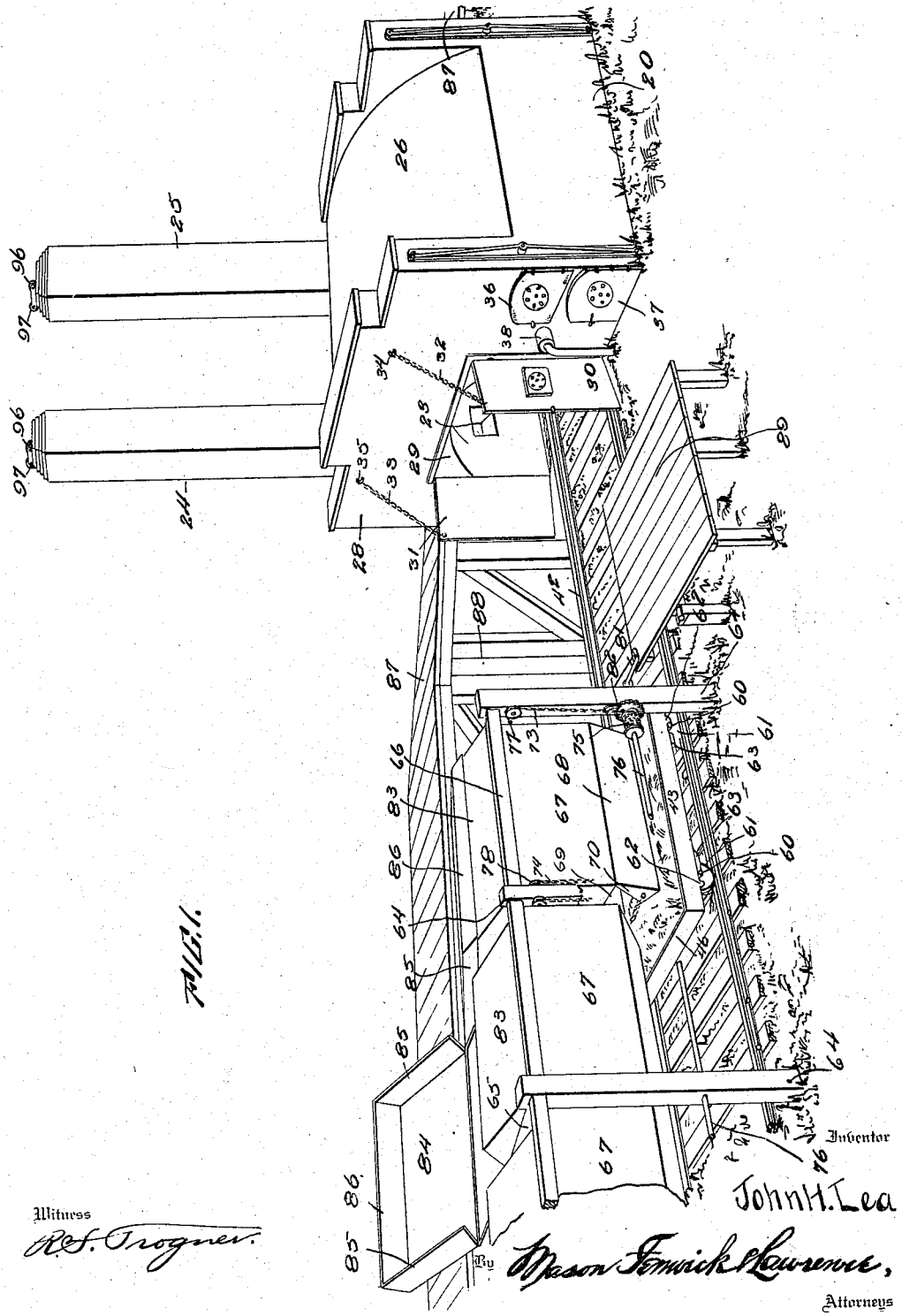

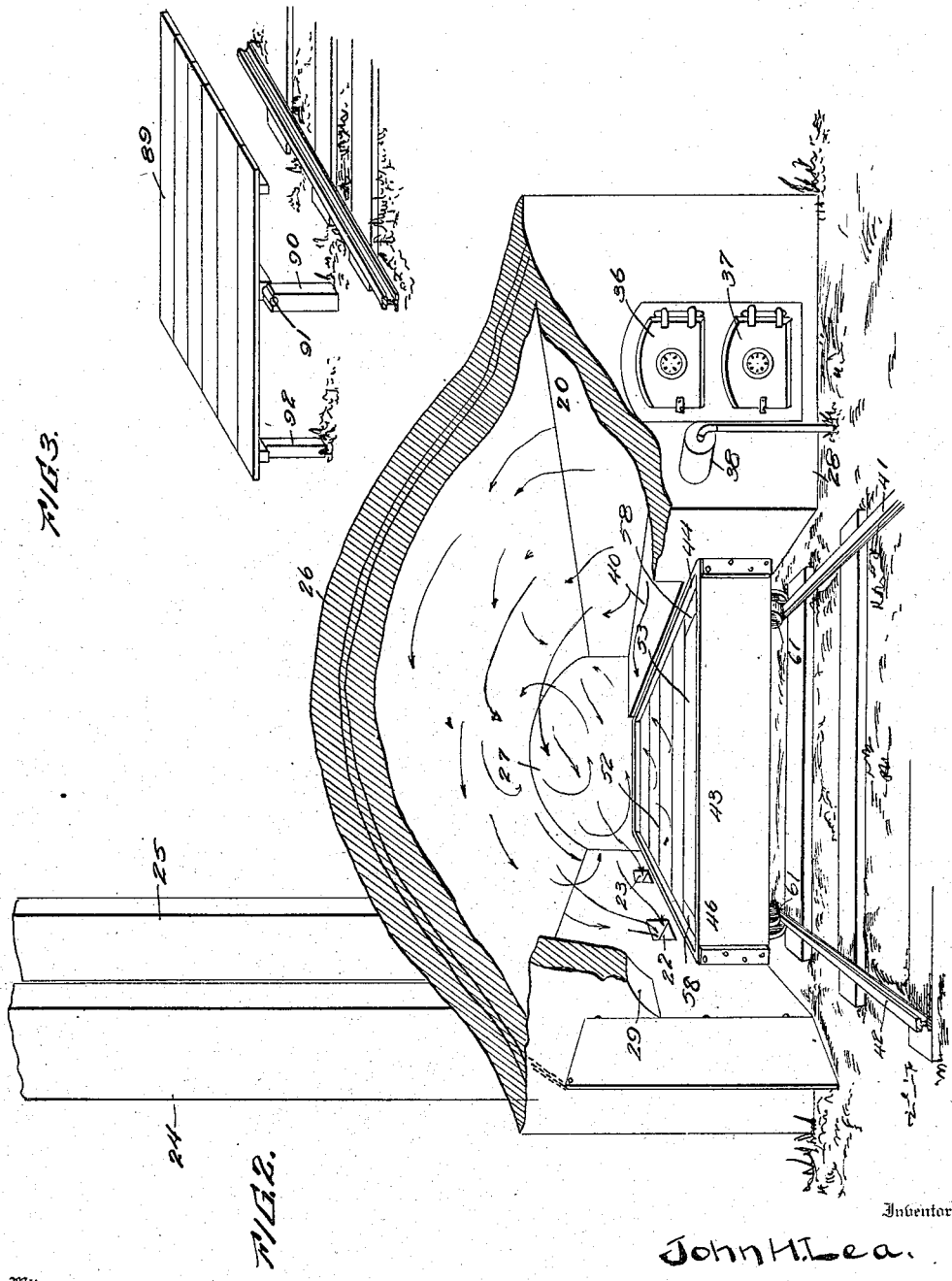

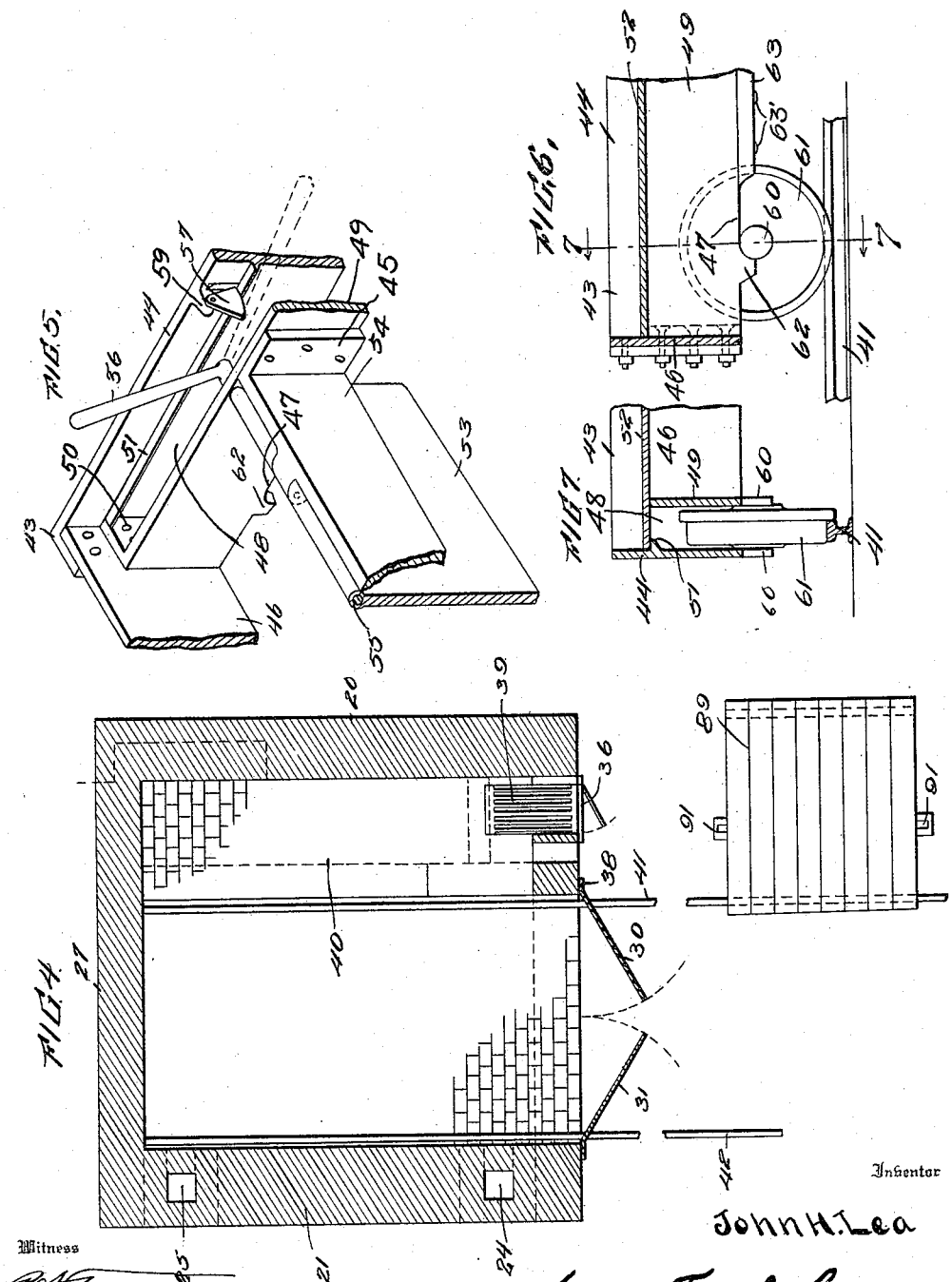

UNITED STATES PATENT OFFICE.

JOHN HOUSTON LEA, OF COFFEYVILLE, KANSAS.

INCINERATING PLANT.

1,175,777.  Specification of Letters Patent.  Patented Mar. 14, 1916.

Application filed June 11, 1915. Serial No. 33,547.

*To all whom it may concern:*

Be it known that I, JOHN H. LEA, a citizen of the United States, residing at Coffeyville, in the county of Montgomery and State of Kansas, have invented certain new and useful Improvements in Incinerating Plants; and I do hereby declare the following to be a full, clear, and exact description of the invention, such as will enable others skilled in the art to which it appertains to make and use the same.

This invention relates to incinerating plants, and while adapted for incinerating a very large range of material, it is especially adapted and intended for incinerating the ordinary city run of garbage and refuse.

An object of the invention is to provide a plant wherein the refuse material is handled with the least expenditure of manual labor, and incinerated by the use of the minimum amount of fuel outside of the fuel content of the refuse itself.

A further object of the invention is to provide a combustion chamber of improved type having improved means for charging the refuse into the combustion chamber and discharging the ash therefrom.

A further object of the invention is to provide a combustion chamber having swinging doors with a track passing through the doors and an improved car traveling upon the track inside and outside the combustion chamber upon which the refuse is supported during incineration.

A further object of the invention is to provide in combination with a combustion chamber and a track leading into the combustion chamber of suspended bins above the track having improved means for receiving and discharging refuse.

A further object is to provide improved bins having hinged bottom sections for discharging the material therefrom with means for preventing the drip of moisture from the bins.

A further object of the invention is to provide a bin having a sloping roof top, one section of which folds backwardly to form a charging chute.

With these and other objects in view the invention consists in certain novel features of construction, combination and arrangement of parts as will be hereinafter more fully described and claimed.

In the drawings:—Figure 1 is a perspective view of the plant showing the doors of the combustion chamber open, the car outside the combustion chamber on the track under one of the bins which is discharging material upon the car, another bin being open forming a chute to receive charging material. Fig. 2 is an interior perspective view, the front wall of the combustion chamber being broken away to show such interior view. Fig. 3 is a perspective view of the skinning table which is positioned beside the track upon which animals are skinned before being dumped upon the car for incineration. Fig. 4 is a plan view of the bottom of the combustion chamber, being a horizontal section through the walls and flue. Fig. 5 is a detail perspective view of one corner of the car showing the ash dumping means. Fig. 6 is a detail sectional view of one corner of the car showing the means of mounting the wheels. Fig. 7 is a transverse sectional view through the wheel mounting taken on line 7—7 of Fig. 6. Fig. 8 is a detail view partly in section of a corner of the car. Fig. 9 is a view in end elevation of one of the bins showing the supporting structure and the elevated driveway in section. Fig. 10 is a view of one of the bins in transverse vertical section. Fig. 11 is a view in end elevation of the skinning table, showing in dotted lines the tilted position for rolling the carcass onto the car. Fig. 12 is a fragmentary detail view of the top of the flue showing the damper and operating means.

Like characters of reference designate corresponding parts throughout the several views.

The combustion chamber forming a part of this plant comprises side walls 20 and 21, the latter being provided with flue openings 22 and 23 communicating with stacks 24 and 25 respectively. The side walls 20 and 21 are joined by an arched roof 26 preferably built up of heat-insulating material, the exact construction, however, being accomplished by any of the usual well-known means for producing heat-insulating walls and roofs. The structure is completed by an end wall 27 at the rear and a front end wall 28, the latter being preferably formed with an arched door opening 29 with doors 30 and 31 hinged to the front wall and preferably, though not necessarily, supported by chains 32 and 33 respectively secured to eyebolts 34 and 35 in alinement with the hinges of the doors. The front wall is also provided with a stoking door 36, an ash door 37, and a fluid fuel burner 38, which, however, are all of the conventional type and need no further explanation as they form no part of the present invention.

Within the chamber a grate 39 is positioned to receive fuel from the stoke door 36, and a ledge 40 is constructed preferably substantially on a level with the grate, the ash pit being below the level of the ledge.

Located within the combustion chamber thus formed and extending out its front end are rails 41 and 42 forming a track for the car shown as a whole at 43, and which constitutes the principal feature of the present invention.

To operate successfully in conjunction with the combustion chamber constructed as aforesaid, a special type of car is necessary, such car comprising side rails 44 and end rails 46 connected at their extremities and making up a box-like frame. Inside and paralleling the side rails 44 are inner side rails 49 spaced therefrom to produce pockets 48, the ends 50 of the inner rails being outturned and secured to the end rails as seen in Fig. 5. All rails are flush on their lower edges, but the inner rails do not rise as high as the side rails, and on the inner faces of the latter are beads 51 which, together with the upper edges of the inner rails, afford supports for the deck of the car shown as a whole at 52 and preferably made up of a plurality of removable plates extending the full width of said frame.

Near each end of the car body an ash dumping plate 53 is provided, the same having a shaft 55 fixed along its upper edge and extending at one end through the inner rail 49 into the pocket 48 and upturned into a lever or handle 56. When this plate is in dumping position as seen in Fig. 5, the handle stands nearly upright, but when the plate is swung upward to a horizontal as seen in Fig. 8, the handle moves downward and may be held in position by a catch 57 pivotally mounted on a lug 59. The hinge support for the rock shaft 55 is a brace 54 extending across within the body of the car, its ends 45 being turned outward and secured to the inner faces of the rails 49. Between said rails the dumping plate 53 moves as it descends, and as it is obvious that it is shorter than the distance between the main side rails 44, filler plates 58 are provided to overlie the ends of the pocket 48 and rest on the upper edges of the inner rails 49 and upon the beads 51, as best seen in Fig. 2. The deck plates 52 are longer than the dumping plates and extend across the full width of the frame so that they rest on said beads as well as upon the inner rails 49, and therefore there is no necessity for the filler plates except opposite the dumping plates.

For supporting the body of the car as thus described, four wheels 61 are provided, each having trunnions 60 rather than full length axles connecting them in pairs as usual. Each wheel is intended to stand upright within one of the pockets 48, and its trunnions rest against the lower edges of the spaced rails 44 and 49. The latter are provided near their outer ends with fixed stops 62, and co-acting therewith are other stops 63 which may be screwed or bolted at 63' to the lower edges of the side rails at proper distances from the fixed stops to leave a runway 47 between them, said runway resting on the trunnions. If only a short track from within the furnace to and past the hoppers is constructed, the runway 47 need not be very long; but in plants where a long track is necessary, the movable stops 63 will be so set as to make the runways 47 of considerable length. In either case as the car moves the wheel travels within the pocket and it never interferes with the handle 56 or catch 57, and what refuse drops through the pocket cannot fall upon the trunnions 60 or lodge upon the runways 47, while such refuse as is dumped by the plate 53 never gets into the pockets at all. This construction of support for the car body is therefore cleanly and not liable to become clogged, it never needs oiling, the wear is very little, a new wheel with new trunnions can be substituted at any time, and the runway can be lengthened as the track from the furnace is extended. Such an arrangement is preferred to regulation bearing boxes for the reason that the heat of the chamber tends to warp or buckle the parts and by constructing them in the manner herein described freer movement of the several parts in relation to each other is permitted.

Outside the combustion chamber and spanning the track a timber structure or trestle is constructed comprising any desider number of upright posts 64 with cross timbers 65 and longitudinal timbers 66 between which are supported a plurality of bins of similar construction, such bins being shown in their entirety at 67. The bins 67 are provided with hinged hopper bottoms comprising bottom plates 68 and 69 having end flanges 70 and 71 turned up, one plate being provided with a lip 72 forming, when closed, a receptacle in the bottom of the angle for the receipt of moisture from the content of the bin. The hopper bottoms are controlled in any usual well-known manner for controlling such hopper bottom receptacles, one means being shown at Figs. 1 and 9, comprising chains 73 and 74 wound about drums 75 carried upon a shaft 76, and after passing over rollers 77 and 78 connect with branch chains 79 and 80 which in turn connect with the sections of the hopper bottom as shown more particularly at Fig. 9.

The shaft 76 is rotated in any approved manner as by the use of crank 81, a pawl and ratchet 82 being provided to prevent return movement. A roof-shaped closure is also provided comprising a rigid or permanent section 83 and a hinged section comprising a cover plate 84 with end flanges 85 and a longitudinal flange 86 proportioned and positioned to lie upon the rigid section 83 when closed, and when turned backwardly to the position shown at Fig. 9 to form with the other parts a charging chute.

To convey the material to the charging chute a platform 87 is provided, one side being supported by the upright posts 64, while other posts 88 are provided to support the opposite side.

A wagon loaded with the refuse material to be incinerated is driven upon the platform, and one of the roof sections moved outwardly to charging position shown at Fig. 9 in the rear of the wagon, the wagon then being unloaded by shoveling or dumping the material into the chute which, in view of its inclination, directs the material into the bin. After the bin is filled or the wagon is unloaded the cover section is returned to closed position which completely closes the bin and prevents the escape of disagreeable odors until the contents of the bin are dumped upon the car by the actuation of the hopper bottom.

As the incinerating plant is intended to incinerate all manner of waste material, means are provided for taking care of dead animals. The means preferably comprise a skinning table 89 mounted at one side of the track and adapted to tilt as shown more particularly at Fig. 11. The support for this table preferably comprises upright posts or supports 90 connected by a rock shaft 91 over which the table is fulcrumed, and an outer support 92. In operation, the animal to be skinned is dumped upon the skinning table between the supports 90 and 92, and after the skinning is completed is rolled over the fulcrum whereupon the table tilts and automatically dumps the carcass upon the car 43.

While the arched structure of the roof of the combustion chamber is such that the gases arising from the material upon the car are gathered in the top of the arch above the flue openings 22 and 23, and are there acted upon by the combustion supported within the chamber to burn all noxious fumes to an inodorous condition, it is desirable under some conditions to provide a supplemental means for burning the noxious fumes. This takes the form of a lid or damper 93 set slightly below the top of the stack as shown at Fig. 12, hinged at 94 and controlled by a wire or cable 95 passing over pulleys 96 and 97 and running down the side of the stack for manual actuation. The fumes are burned at the top of the stack as the fumes are burned at the top of a blast furnace, the construction being similar thereto and operating upon the same principle.

It is believed that the description of the operation of the several parts and units of the complete plant have been sufficiently described to make a description of the operation unnecessary.

What is claimed is:

1. In an incinerating plant, a fire-proof car for garbage and the like comprising a frame-like body made up of connected upright end and side rails, inner side rails narrower than the main side rails and spaced from them to produce pockets, beads on the inner faces of the main side rails flush with the upper edges of the inner side rails, transverse floor plates resting upon said edges and beads, dumping plates shorter than the distance between the inner rails, means for actuating these plates, and filler plates opposite their ends; combined with the running gear located within said pockets.

2. In an incinerating plant, a fire-proof car for garbage and the like comprising a frame-like body made up of connected upright end and side rails of the same height, inner side rails narrower than the main side rails but flush with their lower edges and spaced from them to produce pockets, beads on the inner faces of the main side rails flush with the upper edges of the inner side rails, transverse floor plates resting upon said edges and beads, dumping plates shorter than the distance between the inner rails, means for actuating these plates, and filler plates opposite their ends; combined with individual wheels within said pockets at the corners of the frame and each having trunnions on which the lower edges of the main and inner side rails rest, and fixed and adjustable stops on said edges limiting the travel of said trunnions.

3. A fire-proof car for incinerating plants comprising a frame-like body made up of end and side rails connected at their extremities, inner side rails paralleling and spaced from the main side rails and having out-turned ends secured to the end rails so as to leave pockets along the side of the frame, and transverse braces paralleling and spaced from the end rails and having their ends turned aside and secured to the inner side rails so as to leave dumping openings at the ends of the frame; combined with floor plates extending across the frame and pockets excepting at the ends of the frame, dumping plates in the dumping openings, a rock shaft fixed across one edge of each dumping plate, journaled on said brace, and extending out into a pocket, a lever on its extended end, a lug carried by the side rail, and a catch pivoted to the lug and engaging the lever when the latter is moved to raise the dumping plate.

4. A car for the purpose set forth comprising a box-like frame made up of rails standing on edge and connected at the corners of the frame, beads along the inner faces of the side rails below their upper edges, and supplemental side rails spaced from and narrower than the main side rails with their upper edges flush with said beads and their extremities turned outward and secured within the end rails; combined with removable deck plates extending transversely of the frame and resting on the upper edges of said supplemental rails and on said beads, for the purpose set forth.

In testimony whereof I affix my signature.

JOHN HOUSTON LEA.

Copies of this patent may be obtained for five cents each, by addressing the "Commissioner of Patents, Washington, D. C."